United States Patent
Hayashi

(10) Patent No.: US 11,048,565 B2
(45) Date of Patent: Jun. 29, 2021

(54) CONTROL SYSTEM AND CONTROL APPARATUS

(71) Applicant: YOKOGAWA ELECTRIC CORPORATION, Musashino (JP)

(72) Inventor: Shunsuke Hayashi, Tokyo (JP)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/534,262

(22) Filed: Aug. 7, 2019

(65) Prior Publication Data
US 2020/0050499 A1 Feb. 13, 2020

(30) Foreign Application Priority Data

Aug. 10, 2018 (JP) .............................. JP2018-151885

(51) Int. Cl.
*G06F 9/54* (2006.01)

(52) U.S. Cl.
CPC ...................................... *G06F 9/54* (2013.01)

(58) Field of Classification Search
None
See application file for complete search history.

(56) References Cited

U.S. PATENT DOCUMENTS

| 6,163,817 A * | 12/2000 | Shteyn ...................... G06F 9/54 |
| | | 710/8 |
| 2007/0198599 A1* | 8/2007 | Tobies ................ G06F 16/2379 |
| 2011/0010706 A1 | 1/2011 | Lambert et al. |
| 2013/0253671 A1* | 9/2013 | Torigoe .............. G05B 19/0421 |
| | | 700/82 |

FOREIGN PATENT DOCUMENTS

| JP | 57-86970 A | 5/1982 |
| JP | 11-85713 A | 3/1999 |
| JP | 2002-32244 A | 1/2002 |
| JP | 2009-238068 A | 10/2009 |
| JP | 2015-26279 A | 2/2015 |
| WO | 2018/029820 A1 | 2/2018 |

* cited by examiner

*Primary Examiner* — Craig C Dorais
(74) *Attorney, Agent, or Firm* — Westerman, Hattori, Daniels & Adrian, LLP

(57) ABSTRACT

A control system (2) includes hardware (111), an inter-application interference prevention processing unit (119) that operates in the hardware (111), controller applications (114) that operate on the inter-application interference prevention processing unit (119), and a selection processing unit (115). The controller applications (114) each perform a predetermined calculation on an input value and output a calculated value as a calculation result. The selection processing unit (115) selects one output value based on the calculated values outputted by the controller applications (114) and outputs the output value.

15 Claims, 7 Drawing Sheets

CONTROL SYSTEM AND CONTROL APPARATUS

CROSS-REFERENCE TO RELATED APPLICATION

The present application claims priority to and the benefit of Japanese Patent Application No. 2018-151885 filed Aug. 10, 2018, the entire contents of which are incorporated herein by reference.

TECHNICAL FIELD

The present disclosure relates to a control system and a control apparatus for performing process control.

BACKGROUND

Control systems are required to ensure reliability in accordance with the target of control. Systems using one control apparatus are adopted when high reliability is not required, whereas systems with a redundant configuration that includes two control apparatuses are adopted when high reliability is required. For example, patent literature (PTL) 1 discloses a double calculator system with standby redundancy that uses two control apparatuses called calculators.

The functions of the control apparatus are typically implemented by hardware, such as a central processing unit (CPU) and a memory, and by controller application software. Failure occurring in either the hardware or the software causes failure in operations of the control apparatus. Therefore, the control apparatus disclosed in PTL 1 is configured for both the hardware and the software to be redundant. The probability of failure occurring in the system overall due to hardware is greatly reduced by the hardware redundant configuration. Similarly, the probability of a fault occurring in the system overall due to software is greatly reduced by the software redundant configuration.

CITATION LIST

Patent Literature

PTL 1: JP S57-86970A

SUMMARY

A system with a redundant configuration using two control apparatuses has the advantage of a large increase in reliability compared to a system using only one control apparatus, but has the disadvantages of the number of apparatuses being doubled and of requiring a communication path for database equivalence between control apparatuses and the like. The system cost of a system with a redundant configuration using two control apparatuses, like the system in PTL 1, is typically twice or more that of a system using one control apparatus. The system with a redundant configuration using two control apparatuses and the system using only one control apparatus represent a large tradeoff between reliability and cost, and no intermediate system between these two has been provided.

A control apparatus according to an embodiment includes hardware, an inter-application interference prevention processing unit configured to operate on the hardware, a plurality of controller applications configured to operate on the inter-application interference prevention processing unit, and a selection processing unit. The controller applications are each configured to perform a predetermined calculation on an input value and output a calculated value as a calculation result. The selection processing unit is configured to select one output value based on calculated values outputted by the controller applications and output the output value.

DETAILED DESCRIPTION

Figure 1:
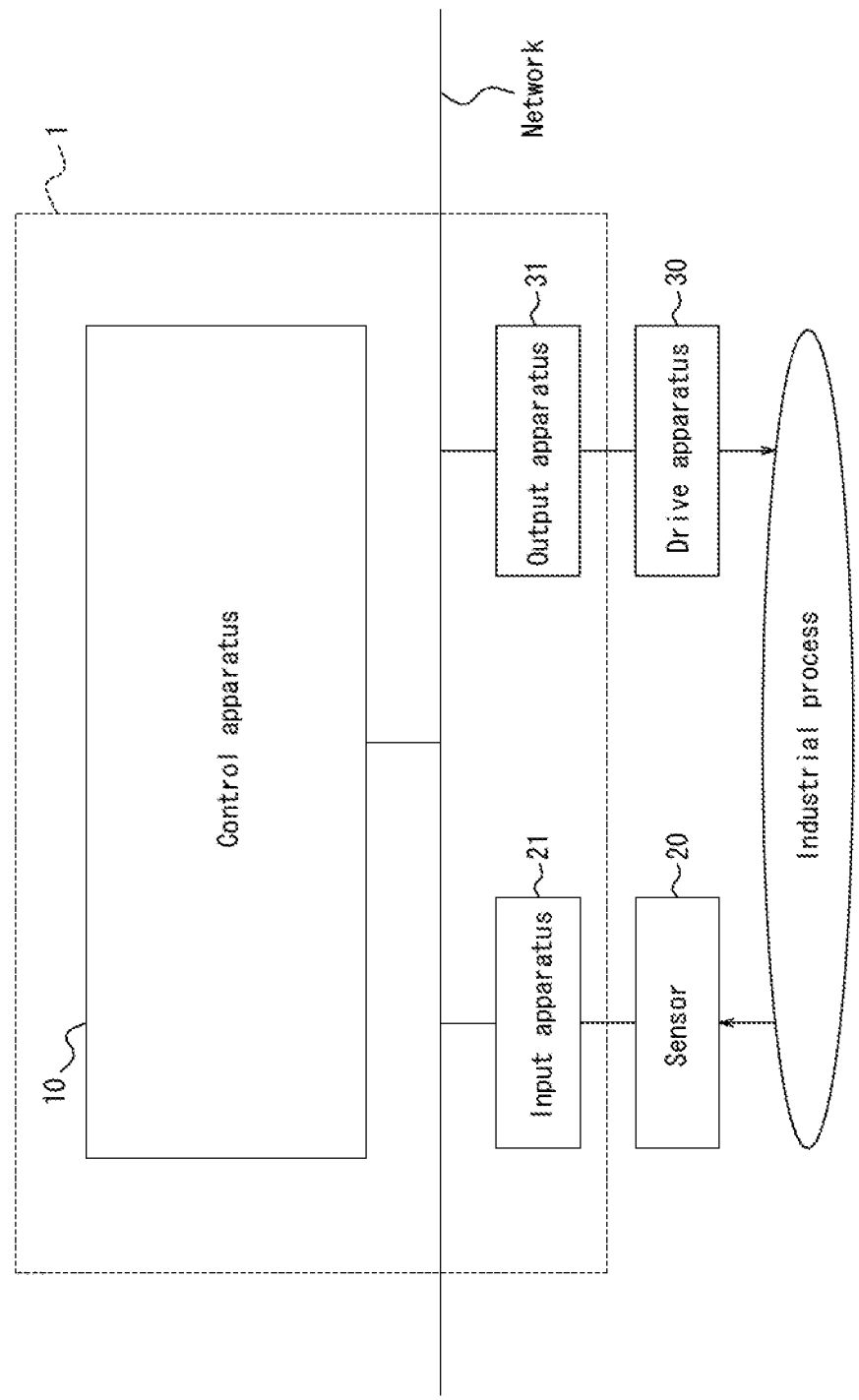
FIG. 1 is a schematic diagram illustrating an example control system.

A system With a redundant configuration Using two control apparatuses has the advantage of a large increase in reliability compared to a system using only one control apparatus, but has the disadvantages of the number of apparatuses being doubled and of requiring a communication path for database equivalence between control apparatuses and the like. The system cost of a system with a redundant configuration using two control apparatuses, like the system in PTL 1, is typically twice or more that of a system using one control apparatus. The system with a redundant configuration using two control apparatuses and the system using only one control apparatus represent a large tradeoff between reliability and cost, and no intermediate system between these two has been provided.

The present disclosure fills this gap by achieving a control system and a control apparatus that can improve reliability while reducing costs.

The present disclosure relates to a control system and a control apparatus that cause a plurality of controller applications to operate with a redundant configuration on one piece of hardware.

A control system according to an embodiment includes hardware, an inter-application interference prevention processing unit configured to operate on the hardware, a plurality of controller applications (controllers) configured to operate on the inter-application interference prevention processing unit, and a selection processing unit. The controllers are each configured to perform a predetermined calculation on an input value and output a calculated value as a calculation result. The selection processing unit is configured to select one output value based on calculated values outputted by the controllers and output the output value. Even when an error occurs, such as a portion of the controllers stopping or calculating abnormal values, the control system with this configuration can continue to provide normal output as long as the selection processing unit selects a proper calculated value. In other words, the control system as a whole can perform normal control operations.

In an embodiment, the control system may include three or more controllers, and the selection processing unit may be configured to select, as the output value, the calculated value occurring most frequently among the calculated values outputted by the controllers or the calculated value constituting a majority among the calculated values outputted by the controllers.

In an embodiment, the number of controllers may be settable.

In an embodiment, the input value may be inputted from an input apparatus to the controllers, and the output value may be outputted from the selection processing unit to an output apparatus.

In an embodiment, the selection processing unit may be configured on different hardware than the hardware on which the inter-application interference prevention processing unit operates.

In an embodiment, the control system may identify a controller that outputs a calculated value that differs from the output value.

In an embodiment, the control system may execute processing to restart the identified controller.

In an embodiment, the processing to restart may be executed based on operation input from an external source.

In an embodiment, the control system may execute replacement processing to replace the identified controller with a spare controller.

In an embodiment, the replacement processing may include processing to reflect information related to the identified controller in the spare controller.

In an embodiment, the control system may output information related to the identified controller or information related to processing executed on the identified controller to an external apparatus or display this information on a display.

In an embodiment, when error information related to the identified controller is outputted, the control system may store and/or analyze the error information.

In an embodiment, resources allocated to the controllers may be set to different values.

In an embodiment, the inter-application interference prevention processing unit may be configured to operate the controllers using an OS operating on the hardware and at least three guest OSs operating on the OS, or be configured to operate the controllers using at least three pieces of virtual hardware on the hardware.

In an embodiment, the inter-application interference prevention processing unit may be configured to operate the controllers using an OS operating on the hardware and at least three containers operating on the OS.

A control apparatus according to an embodiment includes hardware, inter-application interference prevention processing unit configured to operate on the hardware, a plurality of controller applications configured to operate on the inter-application interference prevention processing unit, and a selection processing unit. The controller applications are each configured to perform predetermined calculation on an input value and output a calculated value as a calculation result. The selection processing unit is configured to select one output value based on calculated values outputted by the controller applications and output the output value.

The present disclosure can provide a control system and a control apparatus that improve reliability while reducing costs.

Embodiments of the present disclosure are now described with reference to the drawings.

FIG. 1 is a schematic diagram illustrating an example control system. The control system 1 illustrated in FIG. 1 includes a control apparatus 10, an input apparatus 21, and an output apparatus 31. The control system 1 is used in control or the like of an industrial process in a plant, for example. In the present disclosure, the term "plant" encompasses an industrial plant such as a chemical plant; a plant for managing a well site, such as a gas field or oil field, and the surrounding area; a plant for managing power generation such as hydroelectric power, thermal power, nuclear power, or the like; a plant for managing environmental power generation such as solar power, wind power, or the like; a plant for managing water and sewage, a dam or the like; and other such plants.

The control apparatus 10 connects to a network. The sensor 20 is provided in an industrial process, and a physical quantity of a measurement target is inputted to the control apparatus 10 from the input apparatus 21 over the network as a measurement signal. The control apparatus 10 performs predetermined calculations, for example, based on the inputted measurement signal and outputs a control signal corresponding to the calculation results to the output apparatus 31 over the network. Upon receiving input of the control signal from the output apparatus 31, the drive apparatus 30 drives the industrial process in accordance with the control signal. In the present disclosure, examples of the sensor include sensor devices such as pressure gauges, flow meters, and temperature sensors; microphones that collect abnormal noises and the like inside the plant; position detectors that output position information of various devices; image capturing devices, such as cameras and video recorders, that capture images of the conditions and objects in the plant; and other such devices. Examples of the drive apparatus include valve devices, such as flow control valves and opening/closing valves; final elements, such as fans or motors; acoustic devices such as speakers, that emit warning sounds or the like; and other such devices.

The control apparatus 10 may, for example, be configured by a computer. This control apparatus 10 is configured to run an operating system (OS) on hardware and to run a controller application on the OS. The control apparatus 10 performs calculations on the inputted measurement signal with a predetermined algorithm to generate the control signal.

The functions of a control apparatus are implemented by hardware, such as a CPU and a memory, and by software, i.e. a controller application. The control apparatus becomes inoperable if failure occurs in either the hardware or the software. The failure rate of the control apparatus is therefore determined by the sum of the failure rate of the hardware and the failure rate of the software. Hardware failure often occurs accidentally, whereas software failure is often due to the emergence of a latent bug.

Recently, the increase in software complexity has tended to greatly exceed the increase in hardware complexity, and the probability of failure due to a software bug or the like has become higher than the probability of failure due to hardware. Accordingly, an effective way of ensuring reliability of the control apparatus overall is to avoid the occurrence of failure due to software.

Measures may be taken to make software operations reliable, such as limiting the OS to simple functions or imposing restrictions on the creation of software. Such measures, however, may restrict the functions of the control system or delay the addition of new functions or the like.

A different approach is to run a plurality of controller applications in a redundant configuration on one piece of hardware.

An OS is typically installed to run a plurality of applications on one piece of hardware. Simply running a plurality of identical applications on an OS, however, does not achieve redundancy. The reason is that the OS does not completely exclude inter-application interference.

One example of this is when one or more of the applications running on the OS unnecessarily wastes significant computing resources for some reason. For example, a programming bug in an application may consume an unusually long processing time of the CPU, causing delays in execution of other applications.

A programming bug in an application may, for example also cause a memory leak, which is when, repeatedly, a request for acquisition of a memory area is sent to the OS but the memory is subsequently not released. When a memory leak occurs, the memory resources of the OS may be depleted, and the operations of the OS and all of the applications running on the OS may become unstable.

Problems such as memory leaks can be avoided by thoroughly designing and verifying the controller application implemented on the OS. Many hours of labor are in fact spent on detailed design and verification when controller applications are created.

Programs running on the OS are not, however, limited to controller applications. Applications other than a controller may be installed on and executed by the control apparatus 10. An example of an application other than the controller is an application with a diagnostic function to gather information on the sensor, the drive apparatus, or the industrial process itself and judge whether deterioration or an abnormality has occurred. In terms of cost performance, it is difficult to design and verify all applications running on the control apparatus 10, such as the diagnostic application, to the same level of detail as the controller application.

Furthermore, operation of the controller application may lag due to the OS itself. For example, when a patch or update is performed to fix a weakness in the OS itself, operations of the OS may temporarily lag, and the OS may need to be restarted. In sum, simply installing an OS and running a plurality of controller applications on the OS is not a sufficient solution.

Therefore, a control system that improves reliability while reducing costs is described in the present disclosure.

Figure 2:
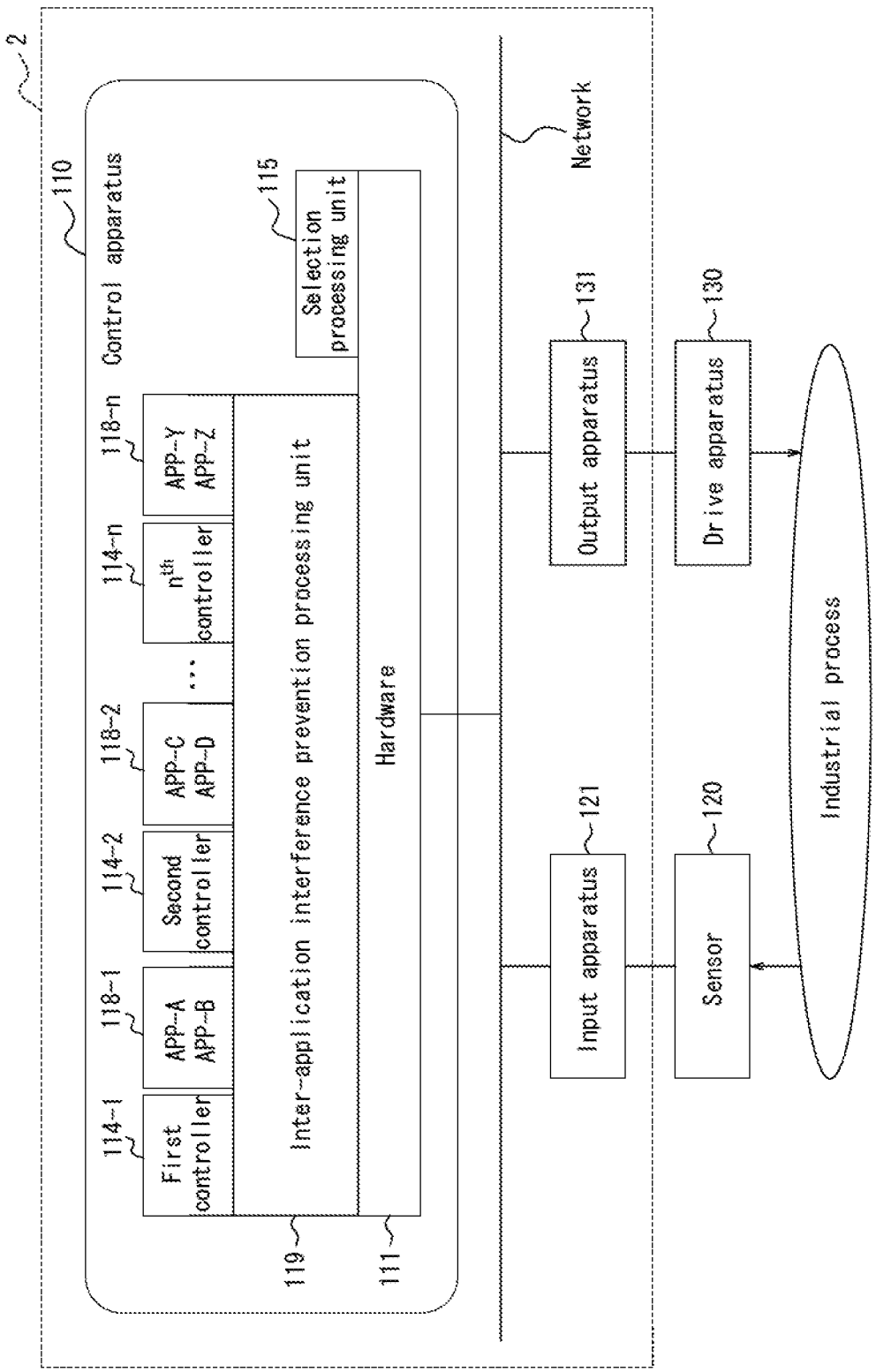
FIG. 2 is a conceptual diagram of a control system according to the present disclosure.

FIG. 2 is a conceptual diagram of a control system according to the present disclosure. As illustrated in FIG. 2, the control system 2 includes one control apparatus 110, an input apparatus 121, and an output apparatus 131. The control system 2 is used in control or the like of an industrial process in a plant, for example.

The control apparatus 110 may, for example, be configured by a computer. The control apparatus 110 includes hardware 111. The hardware 111 is configured by a CPU, memory, and the like, for example.

The control apparatus 110 includes an inter-application interference prevention processing unit 119 and a selection processing unit 115 that run on the hardware 111. The control apparatus 110 includes a plurality of controllers 114-1 to 114-n that run on the inter-application interference prevention processing unit 119. Here, n may be an integer of two or greater. In FIG. 2, applications other than the controllers running on the inter-application interference prevention processing unit 119 are listed as APP-A, APP-B, . . . , APP-Z in FIG. 2. The applications other than the controllers, i.e. APP-A, APP-B, . . . , APP-Z, are not applications required to have high reliability and therefore may have not undergone sufficient operation verification as compared to the controllers. The applications APP-A, APP-B, . . . , APP-Z are combined into application groups 118-1, 118-2, . . . , 118-n.

By using the inter-application interference prevention processing unit 119 and the selection processing unit 115, the control apparatus 110 can perform normal control operations even if failure occurs in the controller. The inter-application interference prevention processing unit 119 may be implemented in various forms. The inter-application interference prevention processing unit 119 may, for example, run the controller applications using an OS running on the hardware and a guest OS running on the OS. The inter-application interference prevention processing unit 119 may, for example, run the controller applications on the hardware using virtual hardware. The inter-application interference prevention processing unit 119 may, for example, run the controller applications using an OS running on the hardware and containers running on the OS. The number of the aforementioned OSs, virtual hardware, and containers may be determined appropriately. For example, this number may be three or more in the case described in the embodiments below, in which an output value is selected by majority decision. Embodiments of the control system according to the present disclosure are described below, including specific forms of the inter-application interference prevention processing unit 119.

First Embodiment

Figure 3:
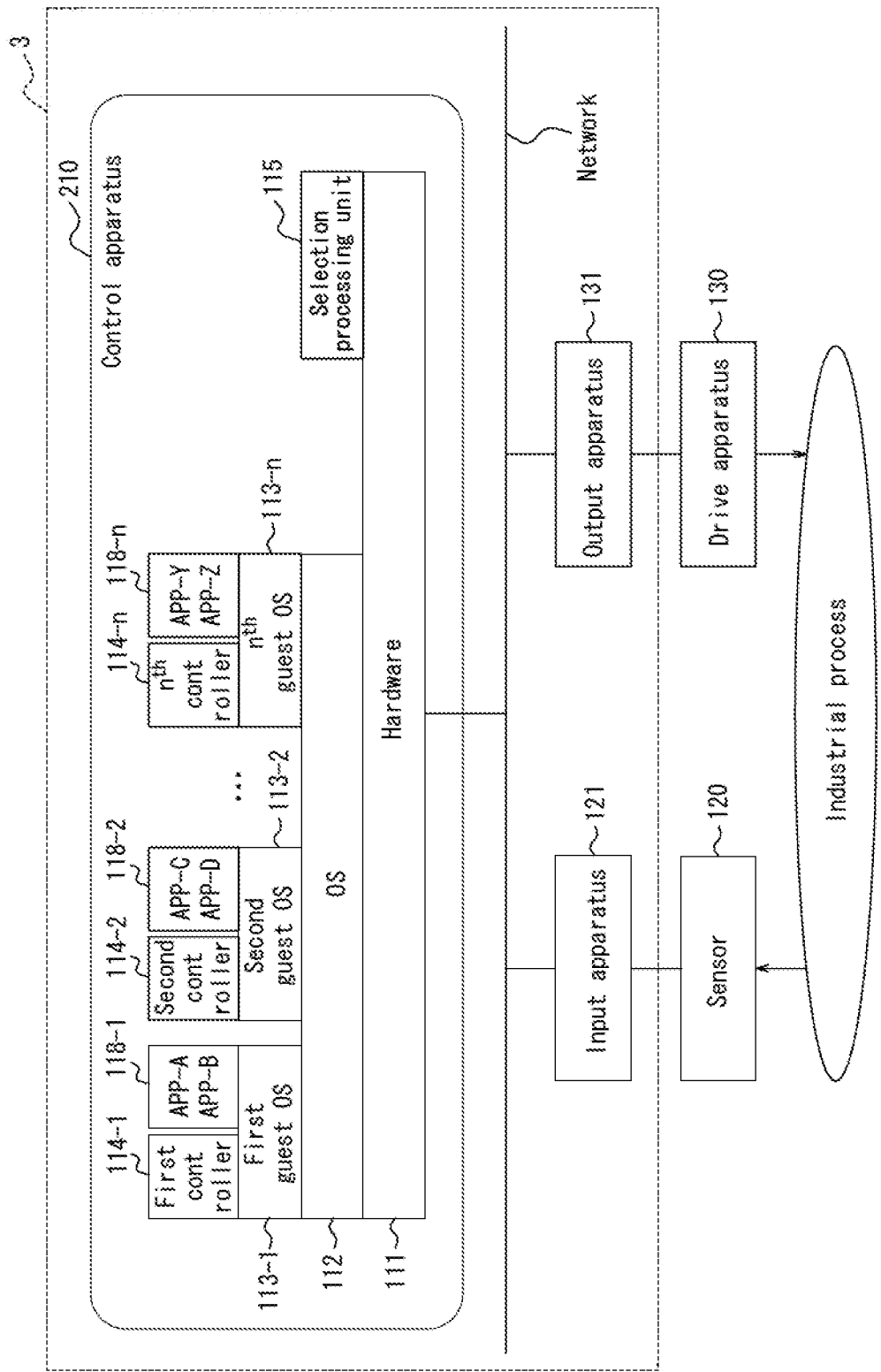
FIG. 3 is a schematic diagram illustrating a control system according to a first embodiment.

FIG. 3 is a schematic diagram illustrating a control system according to a first embodiment. The control system 3 according to the first embodiment includes one control apparatus 210, an input apparatus 121, and an output apparatus 131. The control system 3 is used in control or the like of an industrial process in a plant, for example.

The control apparatus 210 connects to a network. The sensor 120 is provided in an industrial process, and a physical quantity of a measurement target is inputted to the control apparatus 210 from the input apparatus 121 over the network as a measurement signal. The control apparatus 210 performs predetermined calculations, for example, based on the inputted measurement signal and outputs a control signal corresponding to the calculation result to the output apparatus 131 over the network. Upon receiving input of the control signal from the output apparatus 131, the drive apparatus 130 drives the industrial process in accordance with the control signal.

The control apparatus 210 may, for example, be configured by a computer. The control apparatus 210 includes hardware 111. The hardware 111 is configured by a CPU, memory, and the like, for example.

The control apparatus 210 includes an OS 112 running on the hardware 111, a plurality of guest OSs 113-1 to 113-n operating on the OS 112, and a plurality of controllers 114-1 to 114-n respectively running on the plurality of guest OSs 113-1 to 113-n. Applications running on the guest OSs other than the controllers are indicated as APP-A, APP-B, . . . , APP-Z in FIG. 3. The applications APP-A, APP-B, . . . , APP-Z may control the timing at which values calculated by the controllers 114-1 to 114-n are outputted, as described below. The OS 112 functions as the host OS of the guest OSs 113-1 to 113-n. In the present disclosure, the guest OSs are referred to collectively as the guest OS 113 when not distinguishing therebetween. The controllers are similarly referred to collectively as the controller 114 in the present disclosure when not distinguishing therebetween. The application groups are similarly referred to collectively as the application group 118 in the present disclosure when not distinguishing therebetween.

Based on the inputted measurement signal, each controller 114 calculates a value to be applied to the drive apparatus 130. For example, each controller 114 performs calculations on the inputted measurement signal with a predetermined algorithm and outputs the calculation result.

The control apparatus 210 further includes a selection processing unit 115 running on the hardware 111. In the present disclosure, the selection processing unit 115 is described as running on the hardware 111, but the selection processing unit 115 may instead run on the OS 112. The selection processing unit 115 in the present embodiment is configured by software. The selection processing unit 115 in this case may, for example, be constituted by dedicated firmware. The selection processing unit 115 selects one output value based on the calculated value that is calculated by each controller 114. In other words, the calculated value that is calculated by each controller 114 is inputted to the selection processing unit 115. Based on the calculated value outputted by each controller 114, the selection processing unit 115 selects one output value and outputs the selected output value. The control apparatus 210 outputs a control signal based on the output value. The control signal is inputted from the output apparatus 131 to the drive apparatus 130. The drive apparatus 130 controls the process in accordance with the control signal.

The selection processing unit 115 may select one output value with any appropriate method. The selection processing unit 115 can, for example, select any of the calculated values inputted from the controllers 114 to be the output value.

The selection processing unit 115 may be configured to select the output value by majority decision based on the calculated value outputted by each controller 114. In this case, the selection processing unit 115 selects the output value by selecting the calculated value outputted most frequently among the calculated values outputted by the controllers 114. Alternatively, the selection processing unit 115 may select the output value by selecting the calculated value outputted by more than half of the controllers 114 from among the calculated values outputted by the controllers 114. In other words, the selection processing unit 15 may select the output value by selecting the calculated value constituting the majority of the calculated values outputted by the controllers 114.

When the selection processing unit 115 is configured to select the output value by majority decision, the control apparatus 210 may include three or more controllers 114 and guest OSs 113. For example, when the control apparatus 210 includes three controllers 114-1, 114-2, 114-3, the selection processing unit 115 acquires the calculated values outputted by the three controllers 114-1, 114-2, 114-3. Suppose that two of the controllers output the same calculated value, and the other controller outputs a different calculated value. In this case, since the calculated value outputted by the two controllers is the most frequently outputted calculated value, the selection processing unit 115 selects this calculated value.

Suppose that the sensor 120 is a sensor for measuring flow, for example. Suppose also that the selection processing unit 115 is configured to select the output value by majority decision. Further suppose that the drive apparatus 130 is configured by an actuator that adjusts the opening degree of a valve that is attached to a pipe and controls the flow of a fluid flowing through the pipe. In this case, a signal with information related to the flow measured by the sensor 120 is inputted to the control apparatus 210. Based on the acquired information related to the flow, the plurality of controllers 114 in the control apparatus 210 each calculate a value to be outputted to the actuator and output the calculation result as the calculated value. The selection processing unit 115 selects the output value by selecting the calculated value occurring most frequently among the outputted calculated values. The control apparatus 210 outputs the output value selected by the selection processing unit 115 as the control signal. Upon receiving the control signal, the drive apparatus 130 uses the output value to adjust the flow of fluid flowing through the pipe.

The selection processing unit 115 thus selects one output value based on the calculated values inputted from the controllers 114. Consequently, the control apparatus 210 can continue to output a normal output value even when an error occurs in a portion of the plurality of guest OSs 113 or in a portion of the plurality of controllers 114, for example. When the selection processing unit 115 is configured to select the output value by majority decision, for example, the calculated value outputted from controllers 114 in which an error has not occurred can be selected as the output value. For this reason, the control apparatus 210 can continue to produce normal output, and the drive apparatus 130 can be driven normally, even when an error occurs in a portion of the plurality of controllers 114.

Furthermore, even if operations of a portion of the controllers 114 or a portion of the guest OSs 113 become unstable due to failure of a controller 114 or an application group 118, the operation of the OS prevents the operations of other guest OSs from being affected in the control apparatus 210.

In the control system 3 according to the present embodiment, a calculated value is calculated in the plurality of controllers 114 in the control apparatus 210, and an output value is selected by the selection processing unit 115 based on the calculated values. In other words, the control system 3 can achieve redundancy of controller applications with one control apparatus 210. The control system 3 thus differs from the system disclosed in PTL 1 by not requiring a plurality of control apparatuses for redundancy. Therefore, as compared to PTL 1, the control system 3 can reduce costs by reducing the amount of hardware i.e. the number of control apparatuses.

Here, the number of control apparatuses is the dominant factor in determining cost. For example, increasing the computing power or memory capacity of the control apparatus by a factor of n increases the cost not by a factor of n, but by a factor that is between 1 and n and close to 1. Costs also do not increase when multiple copies of the same controller application are installed on one control apparatus if license fees or the like need not be paid. Therefore, the control system 3 according to the present embodiment can achieve redundancy at a lower cost than when using a plurality of control apparatuses for redundancy.

The control system 3 according to the present embodiment is configure to include a plurality of the controllers 114 on one piece of hardware 111 and can therefore input the measurement signal, inputted to the control apparatus 210 from the input apparatus 121, to all of the controllers 114 uniformly. In other words, when a measurement signal related to a value measured by the sensor 120 at a certain time is inputted to the control apparatus 210 from the sensor 120, the measurement signal is inputted to one control apparatus 210. Hence, the same measurement signal is inputted to the controllers 114 on the one piece of hardware 111 regardless of network delays or the like.

The control system 3 according to the present embodiment is configured to include the plurality of controllers 114 on one piece of hardware 111. The data traffic over the network can therefore be reduced as compared to a system that, for example, includes a plurality of control apparatuses distributed over the network. In other words, when the measurement signal is transmitted from the input apparatus 121 to the control apparatuses in the system that includes a plurality of control apparatuses distributed over the network, for example, the measurement signal is transmitted to each control apparatus over the network. Conversely, it suffices to transmit the measurement signal to one control apparatus 210 in the control system 3 according to the present embodiment. The data traffic can thus be reduced in the control system 3 according to the present embodiment. As a result, delays in transmission and reception of the signal due to network congestion can be prevented. The control system 3 can therefore contribute to the achievement of a control system in an architecture environment in which real-time processing is important.

Second Embodiment

Figure 4:
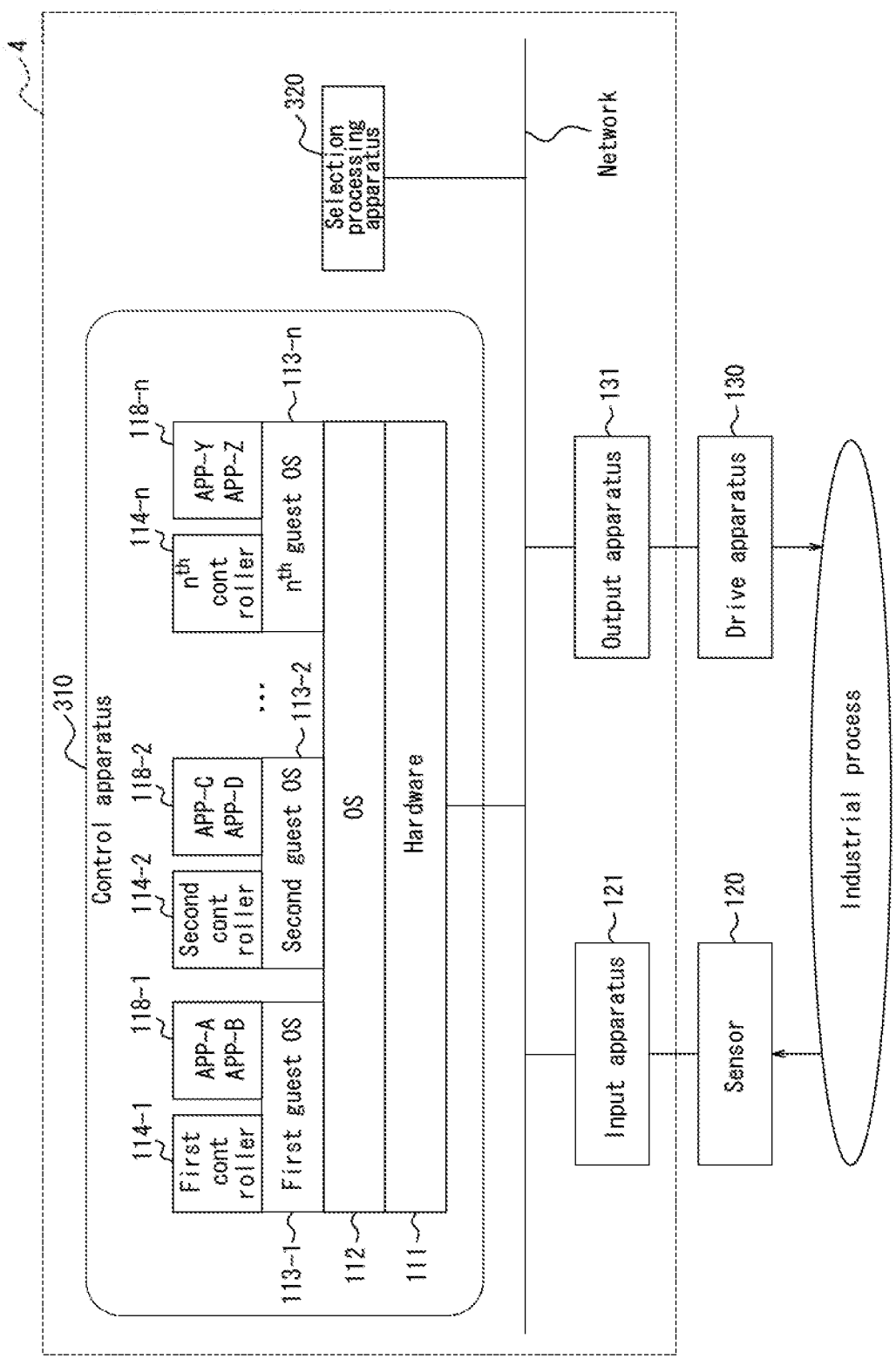
FIG. 4 is a schematic diagram illustrating a control system according to a second embodiment.

FIG. 4 is a schematic diagram illustrating a control system according to a second embodiment. The control system 4 according to the second embodiment includes one control apparatus 310, an input apparatus 121, an output apparatus 131, and a Selection processing apparatus 320. The control system 4 is used in control or the like of an industrial process in a plant, for example. In FIG. 4, the functional components of the control system 4 that have the same configuration and function as the functional components of the control system 3 in FIG. 3 are labeled with the same reference signs. A description of matter similar to the first embodiment is omitted as appropriate to focus mainly on the differences.

As illustrated in FIG. 4, the selection processing apparatus 320 in the control system 4 according to the second embodiment is configured as a separate apparatus independent from the control apparatus 310. The selection processing apparatus 320 connects to a network. In the present embodiment, the control apparatus 310 outputs a calculated value as a calculation result from each controller 114. The selection processing apparatus 320 acquires the outputted calculated values over the network. Based on the calculated value outputted by each controller 114, the selection processing apparatus 320 selects one output value. The selection processing apparatus 320 outputs a control signal based on the output value. The control signal is inputted from the output apparatus 131 to the drive apparatus 130. The drive apparatus 130 operates in accordance with the control signal. For similar reasons as for the above-described control system 3 according to the first embodiment, normal control operations can be performed in this case as well even if operations of a portion of the guest OSs 113 become unstable due to failure of a portion of the controllers 114 or application groups 118. The processing load of the hardware 111 can also be reduced in the present embodiment.

The selection processing apparatus 320 may be configured within the output apparatus 131.

It suffices for the control apparatus in the above embodiments to include two or more controllers 114. When the selection processing unit 115 and the selection processing apparatus 320 are configured to select the output value by majority decision, it suffices for the control apparatuses 210 and 310 to include three or more controllers 114 and guest OSs 113. Although the number of controllers 114 experiencing failure increases as the number of controllers 114 is greater, it becomes easier to continue outputting a normal output value from the control apparatus, thereby increasing reliability. As the number of controllers 114 increases, the amount of time from the occurrence of an error in a portion of the controllers 114 until recovery measures need to be taken can be lengthened. The control system thus becomes more convenient for users, administrators, and the like of the control system as the number of controllers 114 is greater.

For example, suppose that the selection processing unit 115 is configured to select the output value by majority decision and selects the output value by selecting the calculated value outputted by more than half of the controllers 114 from among the calculated values outputted by the controllers 114. In this case, the time until recovery measures need to be taken is the time until an error occurs in half of the controllers 114. The processing to select the output value as the calculated value outputted by more than half of the controllers 114 can be executed within this time. Hence, it suffices for the user, administrator, or the like of the control system to take recovery measures within this time. Accordingly, the control system can continue to be operated even if an error occurs in a portion of the controllers 114 during this time.

The number of controllers 114 in the control apparatuses 210 and 310 may be determined as needed. The number of controllers 114 in the control apparatuses 210 and 310 may be determined in accordance with external input based on an input operation by the user of the control system 3 or 4, for example. The user or the like can thereby change the number of controllers 114 in accordance with usage conditions (such as the required reliability) of the industrial process to which the control system 3 or 4 is applied, for example.

When selecting the output value, the selection processing unit 115 or the selection processing apparatus 320 in the above embodiments may identify a controller 114 that outputted a different calculated value than the output value. An error might have occurred in a controller 114 that outputted a different calculated value than the output value. A controller 114 in which an error might have occurred can therefore be identified by execution of such an identification process.

The OS 112 may execute processing to restart the controller 114 identified in this way. The error occurring in the controller 114 can be resolved by the identified controller 114 being restarted. In this way, error resolution can be achieved by a software-based process of restarting.

The controller 114 may be suspended or restarted intentionally even when no error has occurred. Typically, updating of the controller program, application of a security patch to the guest OS, updating of the guest OS, or the like may delay operations of the controller and require restarting. The control system overall can continue to operate by fewer than the majority of the controller programs or guest OSs being updated in order.

The processing to restart may be executed based on operation input from an external source. In other words, the user, administrator, or the like, for example, may provide operation input to the control apparatus 210 or 310, or another apparatus, for restarting an identified controller 114, and the controller 114 or guest OS 113 may execute processing to restart in response to the operation input. For example, the user or administrator can perform a restart by providing operation input for restarting the controller 114 to another apparatus communicably connected to the control apparatus 210 or 310. Suppose, for example, that the control apparatus 210 or 310 is installed at a separate position from where the user, administrator, or the like is usually stationed, whereas the other apparatus is located by the user, administrator, or the like. In this case, the user or administrator can resolve the error by communicating through the other, remote apparatus without actually going to the position where the control apparatus 210 or 310 is installed. This configuration is more convenient for the user, administrator, or the like.

The OS 112 may execute processing to replace each controller 114 identified as described above with a spare controller. The spare controller refers to a controller, among the plurality of controllers 114, that is not being used. For example, the control apparatus 210 or 310 includes a controller, among the plurality of controllers 114, that is not being used (i.e. that is not processing information) when an error has not occurred in any of the controllers 114. When an error occurs in one of the controllers 114, and the controller 114 is identified by the above-described process, the OS 112 may replace the identified controller 114 with the spare controller. As a result of the replacement, the spare controller is used instead of the controller 114 in which an error may have occurred. This makes it easier to maintain the accuracy of the output value outputted from the control apparatus 210 or 310. Reliability can therefore be improved.

When the OS 112 executes processing to replace each identified controller 114 with a spare controller, the OS 112 may reflect information related to the identified controller 114 in the spare controller. In this case, if an application other than the controller application is installed on the guest OS 113, information related to the application other than the controller application may also be reflected in the spare controller. Information related to the controller 114, for example, such as parameters or settings used in processing executed by the controller 114, may have been modified from initial values in the course of the control of the industrial process by the control apparatus 210 or 310. In this case, the information related to the identified controller 114, i.e. the modified information, may be reflected in the spare controller used to replace the identified controller 114, thereby allowing inheritance by the spare controller. Processing can thus continue under the same conditions before and after replacement of the controller 114. Consequently, reliability can be improved. Such information related to the identified controller 114 may be held by the controller 114 or stored in any appropriate location on the control system 3 or 4.

When predetermined processing is executed on the controller 114, such as restarting or replacing the controller 114 with a spare controller, information related to the controller subjected to the processing or information related to the executed processing may be displayed on a display included in the control apparatus 210 or 310. Information related to the controller subjected to the processing or information related to the executed processing may be displayed on a display included in an external apparatus communicably connected to the control apparatus 210 or 310 over the network. When information related to the controller subjected to the processing or information related to the executed processing is thus displayed, the user, administrator, or the like can check the display to learn information related to the controller 114 subjected to the processing or to learn what processing was executed on the controller 114.

When information related to the occurrence of an error (error information) in the identified controller 114 is outputted, the OS 112 may save the error information and use the error information in a variety of processing. The error information may, for example include information indicating the occurrence of an error, information indicating the settings of the controller 114 when the error occurred, and the like. The OS 112 may store the error information in a memory area within the control apparatus 210 or 310, for example. The OS 112 may store the error information in an apparatus external to the control apparatus 210 or 310, for example. Storage of the error information allows past error information to be accumulated. The OS 112 can also execute various processing using the error information. The OS 112 can, for example, execute processing to analyze the error information. Specifically, the OS 112 can analyze the calculations or the like performed by the controller 114, for example. The cause of occurrence, the conditions, and the like of the error can thereby be investigated. When replacing the controller 114 as described above, information on the analysis results may be reflected in the spare controller that replaces the controller 114. In other words, information on the analysis results may be inherited by the spare controller. The spare controller may refer to the inherited information to perform calculations in such a way that the same error does not occur.

In the above embodiments, the control apparatuses 210 and 310 acquire a measurement signal, outputted by the sensor 120, via the input apparatus 121 and output a control signal to the drive apparatus 130 via the output apparatus 131. Signals in the control apparatus, however, need not be inputted and outputted by the input apparatus 121 and the output apparatus 131.

For example, instead of including the input apparatus 121 and the output apparatus 131, the control system 3 and 4 may include an input/output apparatus having the functions of both the input apparatus 121 and the output apparatus 131. In this case, the measurement signal is inputted to the control apparatus 210 or 310 via the input/output apparatus, and a control signal is outputted from the control apparatus 210 or 310 to the drive apparatus 130 via the input/output apparatus.

Figure 5:
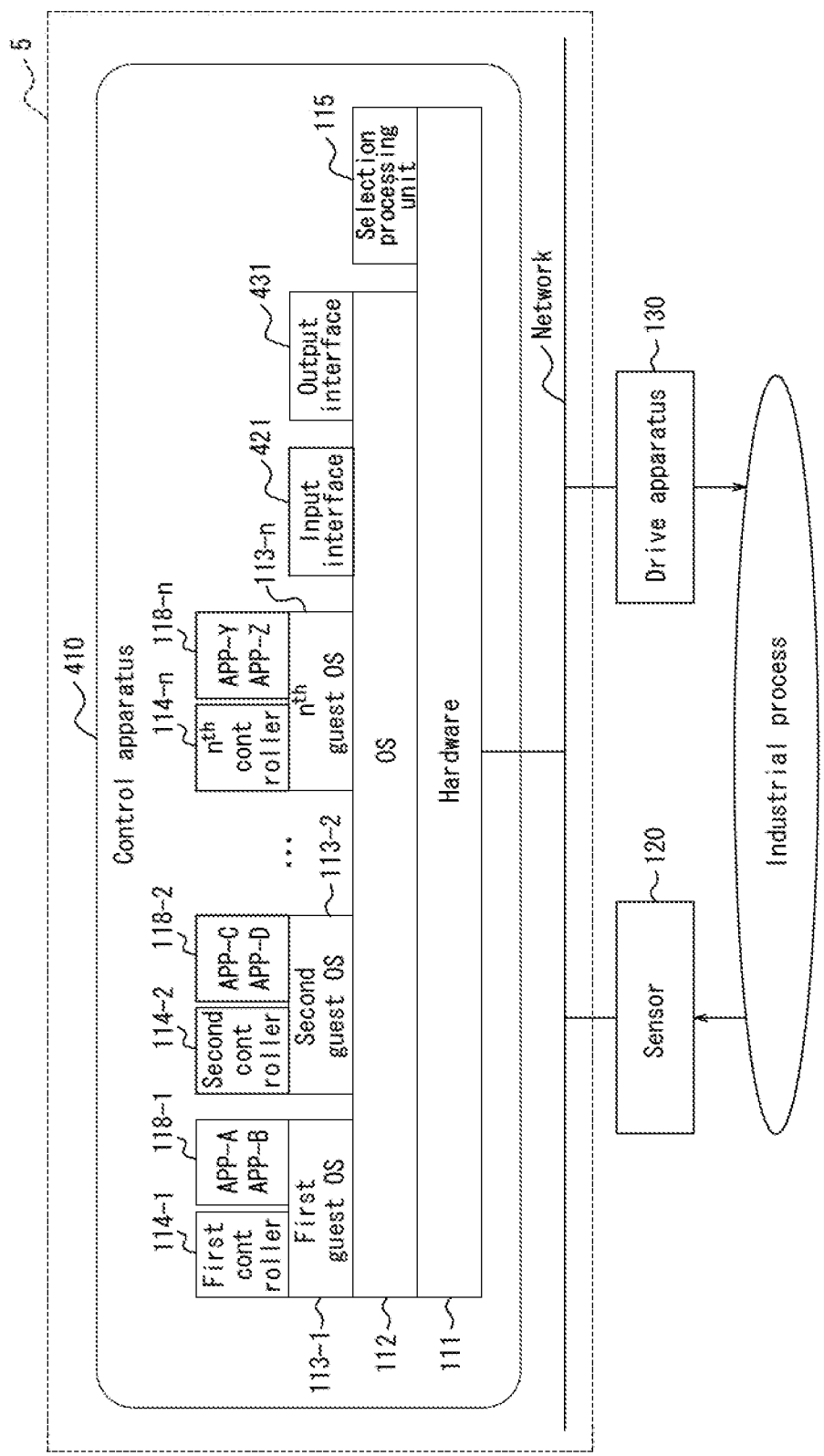
FIG. 5 is a schematic diagram illustrating a modification to the control system according to the first embodiment.

The input apparatus 121 and the output apparatus 131 may, for example, be omitted from the control system. For example, as schematically illustrated in the example in FIG. 5, a control system 5 includes a control apparatus 410, a sensor 120, and a drive apparatus 130 communicably connected over a network. In the control system 5 illustrated in FIG. 5, the control apparatus 410 includes an input interface 421 and an output interface 431 on an OS 112. The input interface 421 executes processing to input signals, and the output interface 431 executes processing to output signals. The control apparatus 410 receives input of a measurement signal, outputted by the sensor 120, via the input interface 421 and outputs a control signal from the control apparatus 410 to the drive apparatus 130 via the output interface 431.

The control system need not include a plurality of guest OSs 113. For example, as schematically illustrated in the example in FIG. 6, a control system 6 includes a control apparatus 510, a sensor 120, and a drive apparatus 130 communicably connected over a network. The control apparatus 510 illustrated in FIG. 6 includes an OS 112 and a selection processing unit 115 running on hardware 111. The control apparatus 510 illustrated in FIG. 6 differs from the control apparatus 210 according to the first embodiment by using a container technique to include a plurality of containers 116-1 to 116-$u$ configured on the OS 112. In the present disclosure, the containers are referred to collectively as the container 116 when not distinguishing therebetween. The containers 116-1 to 116-$n$ respectively include controllers 114-1 to 114-$n$. The container 116 is provided as a dedicated area, in which the controller 114 calculates a value to be applied to the drive apparatus 130 based on an inputted measurement signal and outputs a calculated value as a calculation result, like the case described in the first embodiment. Based on the calculated value outputted by each controller 114, the selection processing unit 115 selects one output value and outputs the selected output value. In this way, the control system 6 as well can perform normal control operations even when failure occurs in a portion of the controllers 114.

Figure 6:
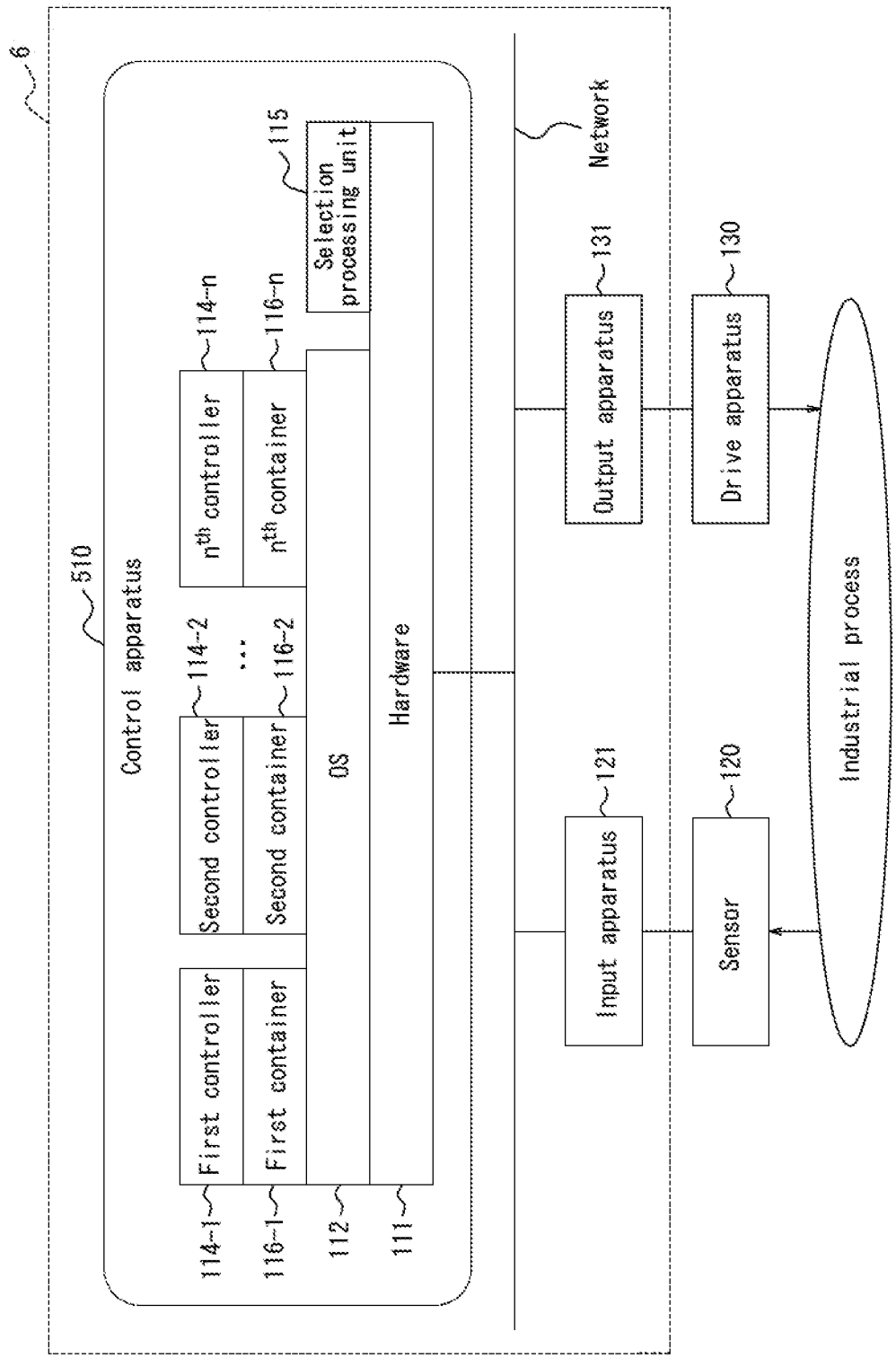
FIG. 6 is a schematic diagram illustrating another modification to the control system according to the first embodiment.

In the control system 6 illustrated in FIG. 6, the control apparatus 510 may include additional containers on the OS 112 other than the containers 116 and may run applications other than the controller (i.e. the aforementioned APP-A, APP-B, . . . , APP-Z) in the additional containers. In this case, the additional containers may be in one-to-one correspondence with the applications other than the controllers. In other words, the same number of additional containers as the number of applications other than the controllers may be provided on the OS 112 of the control apparatus 510.

Figure 7:
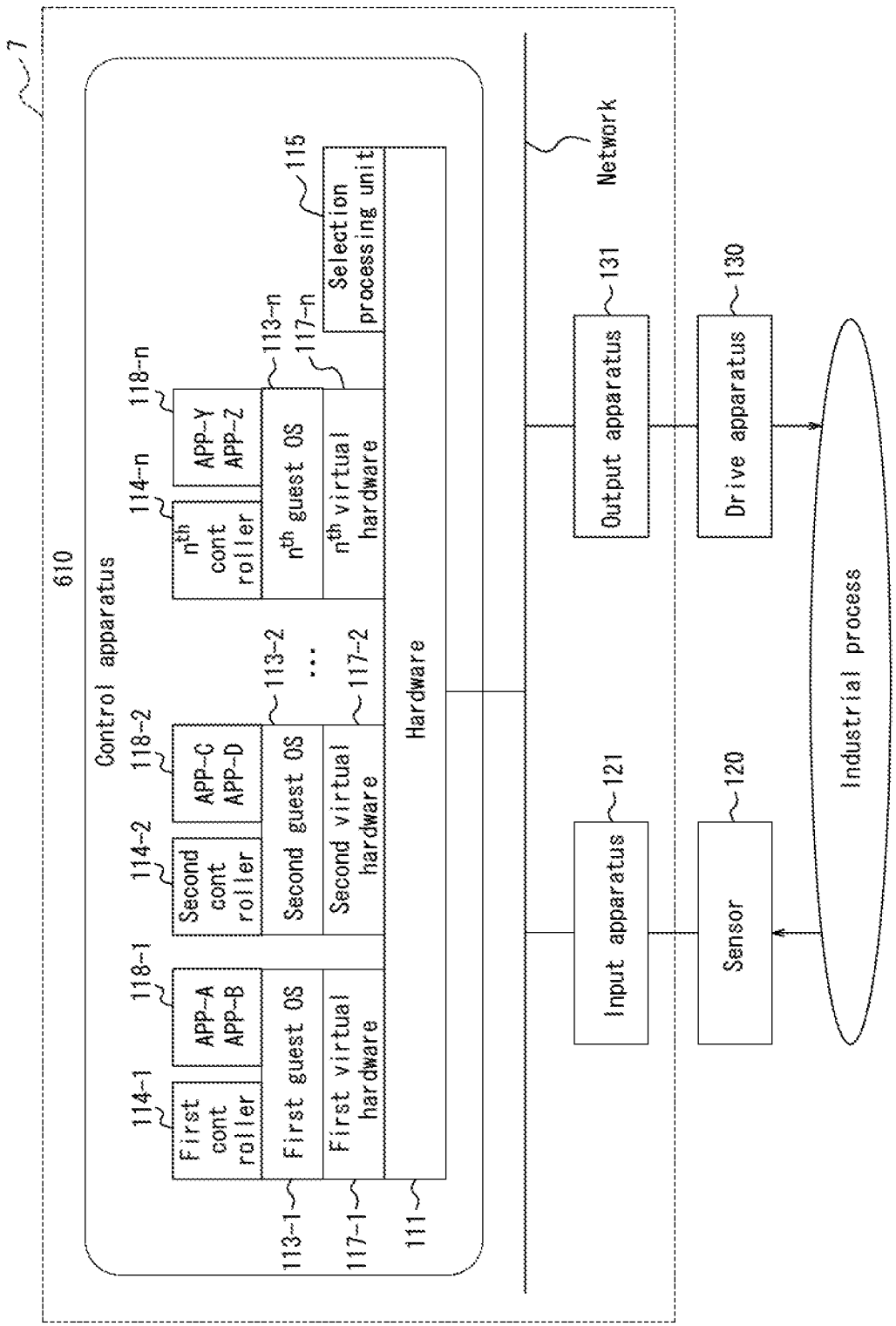
FIG. 7 is a schematic diagram illustrating yet another modification to the control system according to the first embodiment.

For example, as schematically illustrated in the example in FIG. 7, a control system 7 includes a control apparatus 610, a sensor 120, and a drive apparatus 130 communicably connected over a network. Unlike the control apparatus 210 according to the first embodiment, the control apparatus 610 illustrated in FIG. 7 includes a plurality of pieces of virtual hardware 117-1 to 117-$n$ running, on the hardware 111. In the present disclosure, the pieces of virtual hardware are referred to collectively as virtual hardware 117 when not distinguishing therebetween. The control apparatus 610 includes a plurality of guest OSs 113-1 to 113-$n$ operating on the pieces of virtual hardware 117 and a plurality of controllers 114-1 to 114-$n$ respectively running on the plurality of guest OSs 113-1 to 113-$n$. The controller 114 calculates a value to be applied to the drive apparatus 130 based on an inputted measurement signal and outputs a calculated value as a calculation result, like the case described to in the first embodiment. Based on the calculated value outputted by each controller 114, the selection processing unit 115 selects one output value and outputs the selected output value. In this way, the control system 7 as well can perform normal control operations even when failure occurs in a portion of the controllers 114.

In the above embodiments and modifications, the resources that the OS 112, the containers 116, and the virtual hardware 117 allocate to the guest OSs 113, the controllers 114, and the application groups 118 running thereon may be set to different values. When a memory leak occurs, this allows the timing at which failure occurs due to the memory leak to be shifted. For example, suppose that memory capacity is allocated in a ratio of 1 to guest OS 113-1, 1.1 to guest OS 113-2, 1.3 to guest OS 113-3, and 1.7 to guest OS 113-4. Consequently, if the memory resources of each guest OS are wasted at the same pace due to a memory leak caused by a controller, then the timing at which the memory resources of each guest OS are depleted, making the controller inoperable and requiring a restart, varies. In other words, operations of the control system overall can be expected to continue.

Embodiments of the present disclosure have been described with reference to the drawings, but specific configurations are not limited to these embodiments, and a variety of modifications may be made without departing from the spirit and scope of the present disclosure.

The invention claimed is:

1. A control system comprising:
    hardware;
    an inter-application interference prevention processing unit configured to operate on the hardware;
    a plurality of controller applications configured to operate on the inter-application interference prevention processing unit; and
    a selection processing unit;
    wherein the controller applications are each configured to perform a predetermined calculation on one same input value inputted from an input apparatus and output a calculated value as a calculation result; and
    wherein the selection processing unit is configured to select one output value based on calculated values outputted by the controller applications and output the output value to an output apparatus, in accordance with which an industrial process is driven,
    wherein the plurality of controller applications comprises three or more controller applications; and
    wherein the selection processing unit is configured to select, as the output value, a calculated value occurring most frequently among the calculated values outputted by the controller applications or a calculated value the occurring number of which constituting a majority among the calculated values outputted by the controller applications.

2. The control system of claim 1, wherein the number of controller applications is settable.

3. The control system of claim 1, wherein the selection processing unit is configured on different hardware than the hardware on which the inter-application interference prevention processing unit operates.

4. The control system of claim 1, wherein a controller application that outputs a calculated value that differs from the output value is identified.

5. The control system of claim 4, wherein restart processing to restart the identified controller application is executed.

6. The control system of claim 5, wherein the restart processing is executed based on operation input from an external source.

7. The control system of claim 4, wherein replacement processing to replace the identified controller application with a spare controller application is executed.

8. The control system of claim 7, wherein the replacement processing includes processing to reflect information related to the identified controller application in the spare controller application.

9. The control system of claim 4, wherein information related to the identified controller application or information related to processing executed on the identified controller application is outputted to an external apparatus or displayed on a display.

10. The control system of claim 4, wherein when error information related to the identified controller application is outputted, the error information is stored and/or analyzed.

11. The control system of claim 1, wherein resources allocated to the controller applications are set to different values.

12. The control system of claim 1, wherein the inter-application interference prevention processing unit is configured to operate the controller applications using an OS operating on the hardware and at least three guest OSs operating on the OS, or is configured to operate the controller applications using at least three pieces of virtual hardware on the hardware.

13. The control system of claim 1, wherein the inter-application interference prevention processing unit is configured to operate the controller applications using an OS operating on the hardware and at least three containers operating on the OS.

14. A control apparatus comprising:
hardware;
an inter-application interference prevention processing unit configured to operate on the hardware;
a plurality of controller applications configured to operate on the inter-application interference prevention processing unit; and
a selection processing unit;
wherein the controller applications are each configured to perform a predetermined calculation on one same input value inputted from an input apparatus and output a calculated value as a calculation result; and
wherein the selection processing unit is configured to select one output value based on calculated values outputted by the controller applications and output the output value to an output apparatus, in accordance with which an industrial process is driven,
wherein the plurality of controller applications comprises three or more controller applications; and
wherein the selection processing unit is configured to select, as the output value, a calculated value occurring most frequently among the calculated values outputted by the controller applications or a calculated value the occurring number of which constituting a majority among the calculated values outputted by the controller applications.

15. A control system comprising:
hardware;
an inter-application interference prevention processing unit configured to operate on the hardware;
a plurality of controller applications configured to operate on the inter-application interference prevention processing unit; and
a selection processing unit;
wherein the controller applications are each configured to perform a predetermined calculation on one same input value inputted from an input apparatus and output a calculated value as a calculation result,
wherein the selection processing unit is configured to select one output value based on calculated values outputted by the controller applications and output the output value to an output apparatus, in accordance with which an industrial process is driven,
wherein a controller application that outputs a calculated value that differs from the output value is identified, and
wherein replacement processing to replace the identified controller application with a spare controller application is executed.

* * * * *